US008495367B2

(12) United States Patent
Ben-Natan

(10) Patent No.: US 8,495,367 B2
(45) Date of Patent: Jul. 23, 2013

(54) NONDESTRUCTIVE INTERCEPTION OF SECURE DATA IN TRANSIT

(75) Inventor: Ron Ben-Natan, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1513 days.

(21) Appl. No.: 11/709,516

(22) Filed: Feb. 22, 2007

(65) Prior Publication Data

US 2010/0131758 A1     May 27, 2010

(51) Int. Cl.
    *H04L 29/06*           (2006.01)
(52) U.S. Cl.
    USPC ............................ 713/166; 713/189; 713/154
(58) Field of Classification Search
    USPC ........................... 713/154, 166, 189; 719/331
    See application file for complete search history.

(56) References Cited

U.S. PATENT DOCUMENTS

| | | |
|---|---|---|
| 4,451,916 A | 5/1984 | Casper et al. |
| 4,611,205 A | 9/1986 | Eglise |
| 4,672,572 A | 6/1987 | Alsberg |
| 4,956,769 A | 9/1990 | Smith |
| 5,224,058 A | 6/1993 | Mickaels |
| 5,261,102 A | 11/1993 | Hoffman |
| 5,299,257 A | 3/1994 | Fuller et al. |
| 5,325,290 A | 6/1994 | Cauffman et al. |
| 5,355,474 A | 10/1994 | Thuraisngham et al. |
| 5,557,742 A | 9/1996 | Smaha et al. |
| 5,594,899 A | 1/1997 | Knudsen et al. |
| 5,606,668 A | 2/1997 | Shwed |
| 5,701,342 A | 12/1997 | Anderson et al. |
| 5,737,316 A | 4/1998 | Lee |
| 5,758,083 A | 5/1998 | Singh et al. |
| 5,825,772 A | 10/1998 | Dobbins et al. |
| 5,826,267 A | 10/1998 | McMillan |
| 5,828,666 A | 10/1998 | Focsaneanu et al. |
| 5,835,726 A | 11/1998 | Shwed et al. |
| 5,845,281 A | 12/1998 | Benson et al. |
| 5,848,233 A | 12/1998 | Radia et al. |
| 5,881,225 A | 3/1999 | Worth |
| 5,884,025 A | 3/1999 | Baehr et al. |
| 5,953,707 A | 9/1999 | Huang et al. |

(Continued)

FOREIGN PATENT DOCUMENTS

| | | |
|---|---|---|
| EP | 0398645 | 11/1990 |
| WO | 98/31124 A1 | 7/1998 |
| WO | 99/66384 A2 | 12/1999 |

OTHER PUBLICATIONS

Lunt et al., "IDES: A Progress Report," IEEE, 1990.

(Continued)

*Primary Examiner* — David Garcia Cervetti
(74) *Attorney, Agent, or Firm* — Terry J. Carroll; SVL IP Law Edell, Shapiro & Finnan, LLC

(57) ABSTRACT

In a data level security environment, the data level security mechanism operates on plaintext data. Data level security operations identify a point in the information stream where plaintext data is available for interception. Typically this is a point in the processing stream just after the native DBMS decryption functionality has been invoked. A database monitor intercepts and scrutinizes data in transit between an application and a database by identifying a transition point between the encrypted and plaintext data where the cryptographic operations are invoked, and transfers control of the data in transit to a database monitor application subsequent to the availability of the data in plaintext form.

29 Claims, 8 Drawing Sheets

U.S. PATENT DOCUMENTS

| | | | |
|---|---|---|---|
| 5,961,582 A | 10/1999 | Gaines | |
| 5,963,642 A | 10/1999 | Goldstein | |
| 5,974,396 A | 10/1999 | Anderson et al. | |
| 5,978,788 A | 11/1999 | Castelli et al. | |
| 5,978,813 A | 11/1999 | Foltz et al. | |
| 6,009,475 A | 12/1999 | Shrader | |
| 6,016,491 A | 1/2000 | Kou | |
| 6,044,376 A | 3/2000 | Kurtzman, II | |
| 6,049,821 A | 4/2000 | Theriault et al. | |
| 6,052,447 A | 4/2000 | Golden et al. | |
| 6,061,797 A | 5/2000 | Jade et al. | |
| 6,070,243 A | 5/2000 | See et al. | |
| 6,075,926 A | 6/2000 | Atkins et al. | |
| 6,076,168 A | 6/2000 | Fiveash et al. | |
| 6,081,900 A | 6/2000 | Subramaniam et al. | |
| 6,085,191 A | 7/2000 | Fisher et al. | |
| 6,088,796 A | 7/2000 | Cianfrocca et al. | |
| 6,097,399 A | 8/2000 | Bhatt et al. | |
| 6,105,027 A | 8/2000 | Schneider et al. | |
| 6,119,236 A | 9/2000 | Shipley | |
| 6,122,403 A | 9/2000 | Rhoads | |
| 6,125,447 A | 9/2000 | Gong | |
| 6,151,601 A | 11/2000 | Papierniak et al. | |
| 6,192,476 B1 | 2/2001 | Gong | |
| 6,205,475 B1 | 3/2001 | Pitts | |
| 6,226,749 B1 | 5/2001 | Carloganu et al. | |
| 6,230,156 B1 | 5/2001 | Hussey | |
| 6,236,996 B1 | 5/2001 | Bapat et al. | |
| 6,253,321 B1 | 6/2001 | Nikander et al. | |
| 6,272,641 B1 | 8/2001 | Ji | |
| 6,279,010 B1 | 8/2001 | Anderson | |
| 6,298,327 B1 | 10/2001 | Hunter et al. | |
| 6,304,975 B1 | 10/2001 | Shipley | |
| 6,311,272 B1 | 10/2001 | Gressel | |
| 6,330,562 B1 | 12/2001 | Boden et al. | |
| 6,332,163 B1 | 12/2001 | Bowman-Amuah | |
| 6,336,996 B1 | 1/2002 | Steiner | |
| 6,341,312 B1 | 1/2002 | French et al. | |
| 6,347,374 B1 | 2/2002 | Drake et al. | |
| 6,347,376 B1 | 2/2002 | Attwood et al. | |
| 6,356,941 B1 | 3/2002 | Cohen | |
| 6,366,952 B2 | 4/2002 | Pitts | |
| 6,393,568 B1 | 5/2002 | Ranger et al. | |
| 6,442,748 B1 | 8/2002 | Bowman-Amuah | |
| 6,460,046 B1 | 10/2002 | Meek | |
| 6,480,861 B1 | 11/2002 | Kanevsky et al. | |
| 6,496,850 B1 | 12/2002 | Bowman-Amuah | |
| 6,505,241 B2 | 1/2003 | Pitts | |
| 6,529,909 B1 | 3/2003 | Bowman-Amuah | |
| 6,529,948 B1 | 3/2003 | Bowman-Amuah | |
| 6,532,465 B2 | 3/2003 | Hartley et al. | |
| 6,539,396 B1 | 3/2003 | Bowman-Amuah | |
| 6,550,057 B1 | 4/2003 | Bowman-Amuah | |
| 6,578,068 B1 | 6/2003 | Bowman-Amuah | |
| 6,581,052 B1 | 6/2003 | Slutz | |
| 6,601,192 B1 | 7/2003 | Bowman-Amuah | |
| 6,606,660 B1 | 8/2003 | Bowman-Amuah | |
| 6,609,123 B1 | 8/2003 | Cazemier et al. | |
| 6,615,253 B1 | 9/2003 | Bowman-Amuah | |
| 6,633,936 B1 | 10/2003 | Keller et al. | |
| 6,636,585 B2 | 10/2003 | Salzberg et al. | |
| 6,658,091 B1 | 12/2003 | Naidoo et al. | |
| 6,658,625 B1 | 12/2003 | Allen | |
| 6,678,355 B2 | 1/2004 | Eringis et al. | |
| 6,681,331 B1 | 1/2004 | Munson et al. | |
| 6,687,702 B2 | 2/2004 | Vaitheeswaran et al. | |
| 6,694,368 B1 | 2/2004 | An et al. | |
| 6,714,778 B2 | 3/2004 | Nykanen et al. | |
| 6,789,046 B1 | 9/2004 | Murstein et al. | |
| 6,807,546 B2 | 10/2004 | Young-Lai | |
| 6,820,082 B1 | 11/2004 | Cook et al. | |
| 6,842,105 B1 | 1/2005 | Henderson et al. | |
| 6,851,004 B2 | 2/2005 | Hayter et al. | |
| 6,941,369 B1 | 9/2005 | Krack et al. | |
| 6,941,472 B2 | 9/2005 | Moriconi et al. | |
| 7,038,611 B2 | 5/2006 | Gounalis | |
| 7,043,541 B1 | 5/2006 | Bechtolsheim et al. | |
| 7,080,077 B2 | 7/2006 | Ramamurthy et al. | |
| 7,085,834 B2 | 8/2006 | Delany et al. | |
| 7,089,322 B1 | 8/2006 | Stallmann | |
| 7,111,059 B1 | 9/2006 | Garcea et al. | |
| 7,136,995 B1 * | 11/2006 | Wann | 713/153 |
| 7,171,413 B2 | 1/2007 | Puz et al. | |
| 7,231,378 B2 | 6/2007 | Lawson et al. | |
| 7,248,568 B1 | 7/2007 | Loc et al. | |
| 7,308,388 B2 | 12/2007 | Beverina et al. | |
| 7,337,105 B2 | 2/2008 | Sugimoto | |
| 7,342,896 B2 | 3/2008 | Ayyagari | |
| 7,426,512 B1 | 9/2008 | Ben-Natan | |
| 7,437,362 B1 | 10/2008 | Ben-Natan | |
| 7,506,371 B1 | 3/2009 | Ben-Natan | |
| 7,567,819 B2 | 7/2009 | Alone et al. | |
| 7,694,134 B2 * | 4/2010 | Witt et al. | 713/165 |
| 7,904,454 B2 | 3/2011 | Raab | |
| 7,933,923 B2 | 4/2011 | Ben-Natan | |
| 7,945,516 B2 * | 5/2011 | Bishop et al. | 705/50 |
| 7,970,788 B2 | 6/2011 | Ben-Natan et al. | |
| 2002/0007363 A1 | 1/2002 | Vaitzblit | |
| 2002/0010800 A1 | 1/2002 | Riley et al. | |
| 2002/0019944 A1 * | 2/2002 | Kou | 713/200 |
| 2002/0027907 A1 | 3/2002 | Tateoka | |
| 2002/0059451 A1 | 5/2002 | Haviv | |
| 2002/0066033 A1 | 5/2002 | Dobbins et al. | |
| 2002/0066038 A1 | 5/2002 | Mattsson et al. | |
| 2002/0078384 A1 | 6/2002 | Hippelainen | |
| 2002/0095496 A1 | 7/2002 | Antes et al. | |
| 2002/0095603 A1 | 7/2002 | Godwin et al. | |
| 2002/0104017 A1 | 8/2002 | Stefan | |
| 2002/0129140 A1 | 9/2002 | Peled et al. | |
| 2002/0129271 A1 | 9/2002 | Stanaway et al. | |
| 2002/0133723 A1 | 9/2002 | Tait | |
| 2002/0147726 A1 | 10/2002 | Yehia et al. | |
| 2002/0147927 A1 | 10/2002 | Tait | |
| 2002/0152399 A1 | 10/2002 | Smith | |
| 2002/0154646 A1 | 10/2002 | Dubois et al. | |
| 2002/0157020 A1 | 10/2002 | Royer | |
| 2002/0177910 A1 | 11/2002 | Quarterman et al. | |
| 2003/0028624 A1 | 2/2003 | Hasan et al. | |
| 2003/0046302 A1 | 3/2003 | Miron | |
| 2003/0056200 A1 | 3/2003 | Li et al. | |
| 2003/0084320 A1 | 5/2003 | Tarquini et al. | |
| 2003/0084328 A1 | 5/2003 | Tarquini et al. | |
| 2003/0182580 A1 | 9/2003 | Lee | |
| 2003/0217069 A1 | 11/2003 | Fagin et al. | |
| 2003/0217149 A1 | 11/2003 | Crichton et al. | |
| 2004/0024764 A1 | 2/2004 | Hsu et al. | |
| 2004/0093506 A1 * | 5/2004 | Grawrock et al. | 713/189 |
| 2004/0098415 A1 | 5/2004 | Bone et al. | |
| 2004/0111344 A1 | 6/2004 | Fetter et al. | |
| 2004/0111623 A1 | 6/2004 | Miller et al. | |
| 2004/0117037 A1 * | 6/2004 | Hinshaw et al. | 700/2 |
| 2004/0143733 A1 * | 7/2004 | Ophir et al. | 713/153 |
| 2004/0168050 A1 * | 8/2004 | Desrochers et al. | 713/153 |
| 2004/0255301 A1 | 12/2004 | Turski et al. | |
| 2004/0260947 A1 | 12/2004 | Brady et al. | |
| 2005/0005031 A1 | 1/2005 | Gordy et al. | |
| 2005/0071337 A1 * | 3/2005 | Baranczyk et al. | 707/9 |
| 2005/0071650 A1 | 3/2005 | Jo et al. | |
| 2005/0086529 A1 | 4/2005 | Buchsbaum | |
| 2005/0097149 A1 | 5/2005 | Vaitzblit et al. | |
| 2005/0149537 A1 * | 7/2005 | Balin et al. | 707/100 |
| 2005/0203921 A1 | 9/2005 | Newman et al. | |
| 2006/0059154 A1 | 3/2006 | Raab | |
| 2006/0242431 A1 * | 10/2006 | LeCrone et al. | 713/193 |
| 2007/0112864 A1 | 5/2007 | Ben-Natan | |
| 2007/0118543 A1 | 5/2007 | Yamamoto et al. | |
| 2007/0180275 A1 * | 8/2007 | Metzger et al. | 713/194 |
| 2008/0011843 A1 | 1/2008 | Barenburg et al. | |
| 2008/0033960 A1 * | 2/2008 | Banks et al. | 707/9 |
| 2008/0275843 A1 | 11/2008 | Lal et al. | |
| 2009/0271453 A1 | 10/2009 | Ben-Natan | |
| 2010/0131512 A1 | 5/2010 | Ben-Natan et al. | |
| 2010/0132024 A1 | 5/2010 | Ben-Natan et al. | |

OTHER PUBLICATIONS

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection," Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, © 1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ, Dec. 7-11, 1998, pp. 13-24.

Gangadharan, Muralidaran, et al., "Intranet Security with Micro-Firewalls and Mobile Agents for Proactive Intrusion Response," IEEE Intl Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, © 1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybernetics—Part A: Systems and Humans, vol. 31, No. 4, Jul. 2001, pp. 331-336.

Ron Ben Natan, Implementing Database Security and Auditing: A Guide for DBAs, information security administrators and auditors, Elsevier Digital Press (May 2, 2005) pp. 95-108, 177-201, 242-266, 278-293, 324-326, 340-391.

Newman, Aaron, Security Auditing in Microsoft SQL Server (Nov. 3, 2005) [retrieved from http://web.archive.org./web/20051227161250/www.appsecinc./presentations/Security_Auditing_MSSQL.pdf on Apr. 6, 2010].

Applicaton Security, Inc. AppRadar User Guide (Nov. 3, 2005) [retrieved from http://web.archive.org.web/20050204172218/http://www/appsecinc.com/techdocs/AppDetectiveUG.pdf on Apr. 5, 2010].

Guardium Press Release, "Guardium Introduces SQL Guard" (Feb. 9, 2004) [retrived from http://www.guardium.com/index.php/prprint/390 on Mar. 19, 2010].

Webster's II New College Dictionary. Houghton Mifflin Co. (1995). p. 231.

Deri, L; Carbone R; Suin, S. Monitoring Networks Using Ntop (2001) [Retrieved from http://citeseer.ist.psu.edu/old/414959.html on Apr. 7, 2010].

Roesch, Martin. SNORT—Lightweight Intrusion Detection for Networks. Proceedings of LISA '99 13th Systems Administration Conference (Nov. 7-12, 1999) pp. 229-238 [retrieved from http://www.unenix.org on Apr. 6, 2010].

Silberzchatz, A; Korth, H.; Sudarshan, S. Database System Concept. 5th Edition. McGraw-Hill Publishing (May 17, 2005) pp. 934-936, 1078-1079.

Guardium, Inc. Auditing, Compliance, and Privacy Through Effective Controls on Data Access and Usage (Mar. 22, 2005) [retrieved from http://guardium.com on Apr. 6, 2010].

Dar et al., "dbSwitchtm: towards a database utility," Proceedings of the 2004 ACM SIGMOD international conference on Management of data, Jun. 2004 p. 892-896. Retrived from the Internet <URL:http//portal.acm.org/ft_gateway.cfm?id=1005726&type=pdf&coll=ACM&CFID=59243114&CFTOKEN=20435778>.

Feamster et al., "A model of BGP routing for network engineering," Proceedings of the joint international conference on Meaurement and Modeling of computer systems, Jun. 2004, p. 331-342. Retrieved from the internet:URL: http://portal.acm.org/ft_gateway.cfm?id=1005726&type=pdf&coll=ACM&dl=ACM&CFID=59243114&CFTOKEN=20435778>.

SQL Guard Version 4.0.2 User Guide, Aug. 18, 2005.

SQL Guard Version 4.0.2 Administrator Guide, Aug. 18, 2005.

User Guide for SQL Guard Version 5.1, Jul. 14, 2006.

Administrator Guide for SQL Guard Version 5.1, Jul. 21, 2006.

Rao et al., "A New Neural Network Architecture for Efficient Close Proximity Match of Large Databases", Database and Expert Systems Applications, 1997, Proceedings Eighth International Workshop Toulouse, France, Sep. 1-2, 1997, IEEE Comput. Soc. Sep. 1, 1997, pp. 444-449.

Oyama, et al., "Speculative Security Checks in Sandboxing Systems," (Apr. 2005), Proceedings of the 2005 International Parallel and Distributed Processing Symposium (IPDS), pp. 1-8.

Mukhar et al., "Beginning Java Databases," (2001), Wrox Press Ltd., pp. 262-264.

Gray, "Interprocess Communications in Linux," (2003), Pearson Hall PTR, pp. 451-453.

* cited by examiner

NONDESTRUCTIVE INTERCEPTION OF SECURE DATA IN TRANSIT

BACKGROUND

Modern managed information environments are injecting ever increasing levels of security capabilities. At one time, cryptographic operations for safeguarding data were time and computationally expensive such that they were typically reserved for highly sensitive government and financial contexts. As processor speed rises and memory capacities increase, the ability to perform cryptographic operations once only reserved to specialized, expensive hardware is now commonplace in many applications. Conventional off the shelf (OTS) applications embed cryptographic capabilities into software because it no longer creates a processing bottleneck to do so.

Further, as network capacities continue to rise, with increasing use of broadband (e.g. cable modem) Internet access and increasing popularity of WiFi capability (e.g. 802.11b/g wireless), the sheer quantity of data transmitted heightens the awareness that unencrypted transmissions (so called "plaintext") run an increasing risk of divulging sensitive information. There is an emerging tendency to encrypt most or all data during transmission because there are minimal perceived drawbacks to doing so. Accordingly, data in transit between a source and a destination is often encrypted.

SUMMARY

Managed information environments employ so-called "data level" security rather than more traditional application level security to relieve applications and database administrators from application specific changes and database (DB) access tokens such as privileges and access control lists (ACLS). A database or other repository of sensitive material is afforded scrutinized access via such data level security. Scrutinized access involves intercepting and analyzing requests and/or responses, and logging or optionally, filtering the requests and responses so that such data access transactions (requests and responses) are tracked. In a data level security environment, users are permitted to "see" particular parts or attributes of data, regardless of where such a request emanates. This is in contrast to conventional (application level) systems in which particular applications (regardless of the user) may be permitted to access restricted parts while other application specific access may be limited. Further, the modern trend toward application server (app-server) environments, away from traditional client-server architectures, tends to further attenuate the tie between an application and the operating or responsible user.

In a managed information environment employing data level security, requests and responses for data are identified with respect to the user (or other security credential) for which access criteria may be based. The resulting check may merely log the association between the actor and the data, or may proactively prevent or redact sensitive material—the primary focus is enabling an audit trail of data access and the party responsible for the access. Typically, a data level security approach identifies communications between the user applications and the database applications-in contrast to security code embedded in either- and scrutinizes the content contained in the communication while permitting it to pass unhindered along its intended route (i.e. to or from the database). Such a technique is colloquially referred to as "sniffing"—passively observing and logging the data sought and the responsible actor (i.e. user). However, the modern trend of encrypted communications presents challenges for data level security when encrypted transactions are "sniffed," or intercepted, between the user application and the database. Alternatively, however, data level security may also conditionally restrict access by filtering or nullifying sensitive content.

One conventional approach involves providing the data security operations with the same cryptographic keys employed by the database software itself. This conventional approach, however, requires increased dissemination of keys and requires the security operations to keep step with the key management policies of the database, such as periodically changing and superceding the keys, and can be problematic to maintain. Further, such keys are often chosen and/or computed on the fly, so it may not be possible to identify the keys in advance (e.g. in the case of Diffie-Hellman exchange).

Configurations herein are based, in part, on the observation that content sensitive security approaches operate on decrypted (i.e. plaintext data), and therefore need to be able to decrypt the data if it is intercepted in transit between an application and the database. Accordingly, conventional data level security approaches suffer from the shortcoming that encrypted transactions may elude scrutiny because the intercepted transaction cannot be decrypted for analysis by the data level security operation. Such end-to-end encryption renders the data-in-transit unsuitable for conventional data level security approaches that intercept data access transactions in midstream for scrutiny and analysis.

In such a managed information environment, the database is typically accessed via a database management system (DBMS) responsible for receiving queries and other requests and generating responses. The DBMS manages the tables, joins, fetches and updates involved in generating the responses. The DBMS also permits users to select cryptographic security options (encryption), so that data in transit between a requestor (user) and the database remains secure (in so-called "ciphertext"). The DBMS may employ several mechanisms to encrypt the data in transit. These mechanisms differ by the manner and point at which the encrypted (ciphertext) data is decrypted into plaintext. In a data level security environment, the data level security mechanism operates on plaintext data. Hence, the data level security operations need to identify a point in the information stream where plaintext data is available for interception. Typically this is a point in the processing stream just after the decryption functionality has been invoked.

Accordingly, configurations herein substantially overcome the shortcomings of conventional approaches to intercepting and scrutinizing data in transit between an application and a database by identifying a transition point between the encrypted and plaintext data where the cryptographic operations are invoked, and transferring control of the data in transit to a database monitor application subsequent to the availability of the data in plaintext form. In other words, the database monitor application intercepts the data in transit at a point just beyond the decryption operation, performs analysis and logging operations, and returns the plaintext data to the expected data stream, therefore providing the DB security monitor with support for encryption of data in transit.

Transferring control of the cryptographic invocation involves examining the communications architecture to identify where the data-in-transit is delegated to a cryptographic operation, and inserting an appropriate interception mechanism to capture the unencrypted data in transit without disrupting the flow of the plaintext data to its intended destination. Typically, delegation to (i.e. invocation of) a cryptographic operation occurs via either a system call, a dynamically linked library call (DLL), or a direct static linkage call (i.e. a stack call). Identification of and insertion of an appropriate interception involves varying degrees of intrusiveness, discussed further below. The above shortcomings are substantially overcome by an architecture for intercepting secure data in transit by assessing and covering transaction paths into a particular node or entity such as a database. The architecture recognizes each path from which transactions may arrive and identifies a point in each path for interception of plaintext (unencrypted) data.

A system call is often identifiable by tracking an assigned processing unit (i.e. windows thread), and observing socket activity to a port associated with cryptographic operation. This approach is discussed further in copending U.S. patent application Ser. No. 11/642,432, entitled IDENTIFYING ATTRIBUTE PROPAGATION FOR MONITORING DATA REPOSITORY ACCESS, filed Dec. 20, 2006, incorporated herein by reference. Another mechanism includes the use of a DLL call to a cryptographic operation. Such an invocation may be intercepted by identifying a call signature to the cryptographic functions, and inserting a similarly named signature as a binding label (e.g. link entity) prior to the cryptographic invocation. The inserted signature is linked prior to the intended cryptographic operation, and serves to capture the plaintext data after itself calling the intended cryptographic operation. Other approaches employ end-to-end encryption, such that the cryptographic invocation is a static linkage from the DBMS process or thread. In such a scenario, the executable image is examined for machine instructions (i.e. opcodes) to branch or jump to the cryptographic function performing the decryption operation. The executable instructions invoking the cryptographic function are identified, and the instruction sequence in the executable image is modified to replace or follow the branch instruction with a jump to an instruction sequence for capturing the plaintext data, discussed further below.

A further scenario is presented by the use of an encryption service such as with an IPSEC implementation. IPSEC provides end-to-end encryption between two network endpoints, and is popular in VPN configurations because only the entry routers to the trusted VPN need employ IPSEC. Communications within the VPN are already covered, so other VPN nodes need not be modified, only the IPSEC endpoint routers. Communications to and from the IPSEC endpoint routers appear to be the source/destination, even if the communication is directed to another node deeper in the VPN, through the use of NAT (network address translation), common in such implementations.

The database security monitor provides support for encryption of data in transit by intercepting IPC invocations such as port reads to access plaintext data. By identifying a predetermined port or other IPC mechanism higher in the stack, i.e. after the IPSEC decryption, plaintext data in transit is interceptable by watching port reads on ports to which the plaintext data is directed.

In further detail, the system for monitoring secure data in transit in a database environment disclosed herein includes identifying a transfer of control to in a processing sequence a cryptographic operation, and determining an appropriate interception sequence operable to receive plaintext data returned from the cryptographic operation. The mechanism replaces the identified transfer of control with an interception sequence operable to forward plaintext data from the cryptographic application and forward it to a database monitor application, and return the plaintext data in an unmodified form to the processing sequence. Identifying the transfer of control includes identifying invocations to the cryptographic operations, including but not limited to operating system calls to an interprocess communication (IPC) mechanism, dynamically linked library (DLL) calls to invoke a decryption operation, and static linkages to the decryption operation.

The system provides an architecture for defining database security that includes identifying a stream of encrypted data in transit from a client to a host, such as a database server, and determining a transition from encrypted data to decrypted data, such that the transition (based on a transfer of control to the decryption) is indicative of invocation of a cryptographic operation to generate decrypted data from the encrypted data. The architecture determines an interception point following the determined transition, and selects, based on the encryption invocation, a manner of accessing the decrypted data at the determined interception point.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein substantially overcome the shortcomings of conventional approaches to intercepting and scrutinizing data in transit between an application and a database by identifying a transition point between the encrypted and plaintext data where the cryptographic operations are invoked, and transferring control of the data in transit to a database monitor application subsequent to the availability of the data in plaintext form. The database monitor application intercepts the data in transit at a point just beyond the decryption operation, performs analysis and logging operations, and returns the plaintext data to the expected data stream.

Transferring control of the cryptographic invocation involves examining the communications architecture to identify where the data-in-transit is delegated to a cryptographic operation, and inserting an appropriate interception mechanism to capture the unencrypted data in transit without disrupting the flow of the plaintext data to its intended destination. Typically, delegation to (i.e. invocation of) a cryptographic operation occurs via either a system call, a dynamically linked library call (DLL), or a direct static linkage call (i.e. a stack call). Identification of and insertion of an appropriate interception involves varying degrees of intrusiveness, discussed further below. The above shortcomings are substantially overcome by the disclosed architecture for intercepting secure data in transit by assessing transaction paths into a database host. The architecture recognizes each path from which transactions may arrive and identifies a point in each path for interception of plaintext (unencrypted) data.

Figure 1:
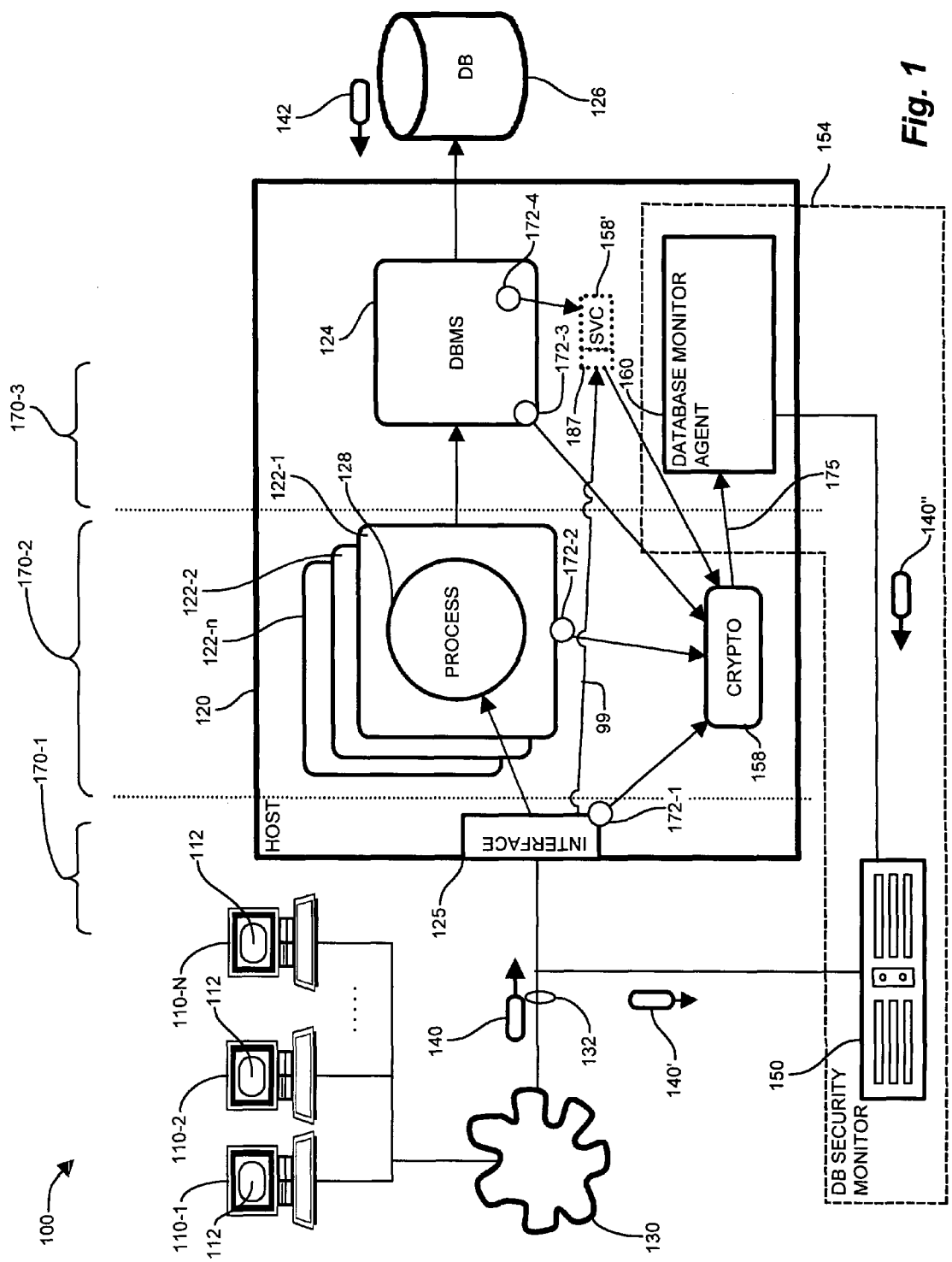
FIG. 1 is a context diagram of an exemplary managed information environment suitable for use with the present invention.

FIG. 1 is a context diagram of an exemplary managed information environment suitable for use with the present invention. Referring to FIG. 1, a managed information environment 100 includes user nodes 110-1 . . . 110-n (110 generally) coupled to a host 120 via a network 130. The user nodes 110 are typically PCs or other local computing devices having a graphical user interface (GUI) 112 operative to communicate interactively with the host 120. The host 120 provides services, such as data access and retrieval services, via a host application 122-1 . . . 122-n (122 generally) coupled to the counterpart GUI 112. The host application 122 includes coupling to one or more database server processes 128 for executing instructions to carry out delivery of the services to the user 110. In the exemplary configuration, the host application 122 is a database server coupled to a database management system (DBMS) 124 for providing data access and retrieval services to the user 110 via the database 126, thus the process 128 is a database server or agent process responsible for coupling the interface 125 with the DBMS 124.

A typical database environment 100 often employs a data level security mechanism 154. Such a data level security mechanism focuses on the data access transactions 140, 142 to and from the database, rather than a privilege or access control list at an invoking application 122. The data level security mechanism 154 may include an external database security monitor 150, a database monitor agent 160, or a combination of these, effectively defining the data level security mechanism (database monitor) 154. As indicated above, security of the data in the database 126 is paramount. Accordingly, a database monitor 154 intercepts and scrutinizes the data access transactions 140, either by intercepting the transactions 140' over a network connection to an interface, or by the database monitor agent 160 as transactions 140". For performance reasons, it is often sought to capture the access transactions 140 on the network connection 132, prior to the interface 125, to offload security processing from the host 120. However, as will be discussed further below, certain contexts also employ the database monitor agent 160 on the host 120.

As discussed above, many database management systems 124 encrypt data access transactions 140 to avoid exposure of sensitive data items while in transit from an application GUI 112 to the database 126. Data access responses 142 may be similarly covered. However, the database monitor 154 operates on plaintext (unencrypted) data. Accordingly, the database monitor 154 identifies an interception point 172-1 . . . 172-4 (172 generally) corresponding to the transition of ciphertext to plaintext, and captures the plaintext transaction 140" for scrutiny. Depending on the encryption employed by the particular DBMS 124, the interception point 172 may occur in one of several places. In the case of DBMS IPC interception (i.e. port read watching) shown as interception point 172-4, the interception point 172-4 is triggered by a port 187 read to read data passed from the interface 125 to the port 187 via arrow 99. The communication comes encrypted from the interface 125 and the SVC 158' decrypts the data by calling the cryptographic operation 158. It then passes the unencrypted data to the DBMS 124, which is where the actual interception occurs, discussed further below.

When the cryptographic operation for decryption 158 is invoked from the interface 125, an interprocess communication (IPC) mechanism is employed to intercept the database access transaction 140 at the interface 125 from the network connection 132, typically by a port read on a socket, shown in interception zone 170-1. The interception point 172-1 is a predetermined port employed by the DBMS 124 for receiving database access transactions 140, and is effected by watching or establishing an intercept triggered on the predetermined port. In this manner, operating system (OS) calls to read the ports corresponding to database transactions 140 result in the database monitor reading the port, scrutinizing the data, and passing it along as intended to the DBMS 124, discussed in further detail in the copending U.S. patent application cited above.

The interception occurs in zone 170-2 when a dynamically linked list (DLL) invocation to the cryptographic operation is employed. A call signature (180, FIG. 3) corresponding to the decryption operation 158 is superceded by inserting a database monitor call signature (182, FIG. 3) prior to the decryption operation at interception point 172-2, in zone 170-2. The DLL processing satisfies the linkage with the monitor signature 182 before the originally intended signature 180 of the cryptographic operation 158. The database monitor 152 invokes the cryptographic operation 158, scrutinizes the transaction 140, and subsequently returns control.

In an end-to-end encryption scheme, the DBMS process 124 itself includes the invocation 172-3 to the decryption operation 158 via a static linkage. In this instance, the instructions in the executable image (the memory resident machine epodes) are examined to identify the invocation to the decryption operation, typically a stack call. The instructions are replaced with instructions to defer control to the database monitor 154, which then invokes the decryption operation 158 and scrutinizes the transaction 140. These mechanisms are discussed in further detail below with respect to FIG. 3.

Security monitoring support for encryption of data in transit may also be provided by an alternate arrangement to address end-to-end encryption via an encryption service. In this configuration, the database server (DBMS) 124 is not doing the encryption/decryption itself, but some external service. A particular example includes IPSEC. If IPSEC is used, the monitor 154 cannot sniff on the network 132 because it is encrypted. Ipsec is beneficial because it provides end-to-end encryption in the TCP/IP protocol itself, and thus can be implemented in a gateway router to a VPN or trusted network space without affecting all nodes beyond the gateway router. The monitor 154 also cannot intercept at 172-1, as it still receives encrypted packets because it is too low in the stack. In such a scenario, show at interception point 172-4, kernel-level interception/sniffing support is employed to intercept IPC calls from the DBMS 124, similar to the mechanism employed in the copending application cited above. This type of interception allows the agent 160 to see socket and/or pipe reads/writes such that when the networking layers of the OS write to the database socket it is already decrypted.

Therefore, continuing to refer to FIG. 1, support for watching OS calls is employed to identify reads and writes to a particular port 187. Depending on the type of encryption service employed, invocations from the DBMS 124 will employ an ascertainable port for invoking the encryption service 158' or for writing decrypted data to the database 126. In either case, the port 187 corresponding to plaintext data access to the DB 126 is watched, and port 187 reads captured to intercept the plaintext data.

Figure 2:
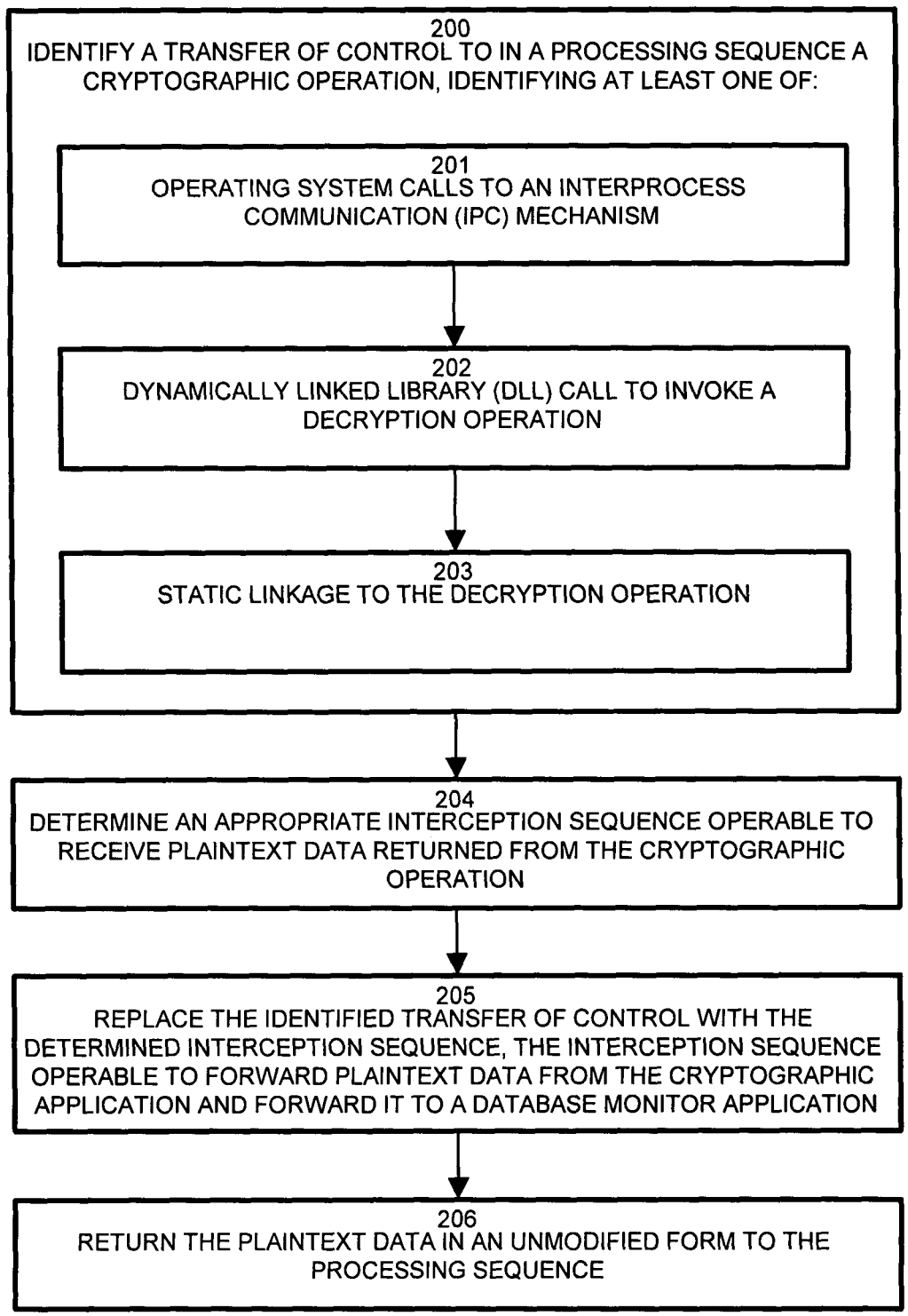
FIG. 2 is a flowchart of interception of secure data in transit in the environment of FIG. 1.

FIG. 2 is a flowchart of interception of secure data in transit in the environment of FIG. 1. Referring to FIGS. 1 and 2, the system for monitoring secure data in transit in a database environment 100 includes identifying a transfer of control 172 in a processing sequence a cryptographic operation 158, as depicted at step 200. Identifying the transfer of control 172, in the example shown, includes either identifying operating system calls to an interprocess communication (IPC) mechanism, as shown at step 201, identifying dynamically linked library (DLL) call to invoke a decryption operation, depicted at step 202, or identifying a static linkage to the decryption operation, as shown at step 203. The mechanism determines an appropriate interception sequence operable to receive plaintext data returned from the cryptographic operation 158, as disclosed at step 204. The appropriate interception sequence depends on the mechanism and location of the decryption operation 158 for encrypting the received transaction (access request). The mechanism then replaces the identified transfer of control with the determined interception sequence, such that the interception sequence is operable to forward plaintext data from the cryptographic operation 158 and forward it to the database monitor application 154, as depicted at step 205. The interception sequence is nonintrusive such that the interception may also return the plaintext data in an unmodified form to the processing sequence expected by the original transaction 140, as disclosed at step 206.

Figure 3:
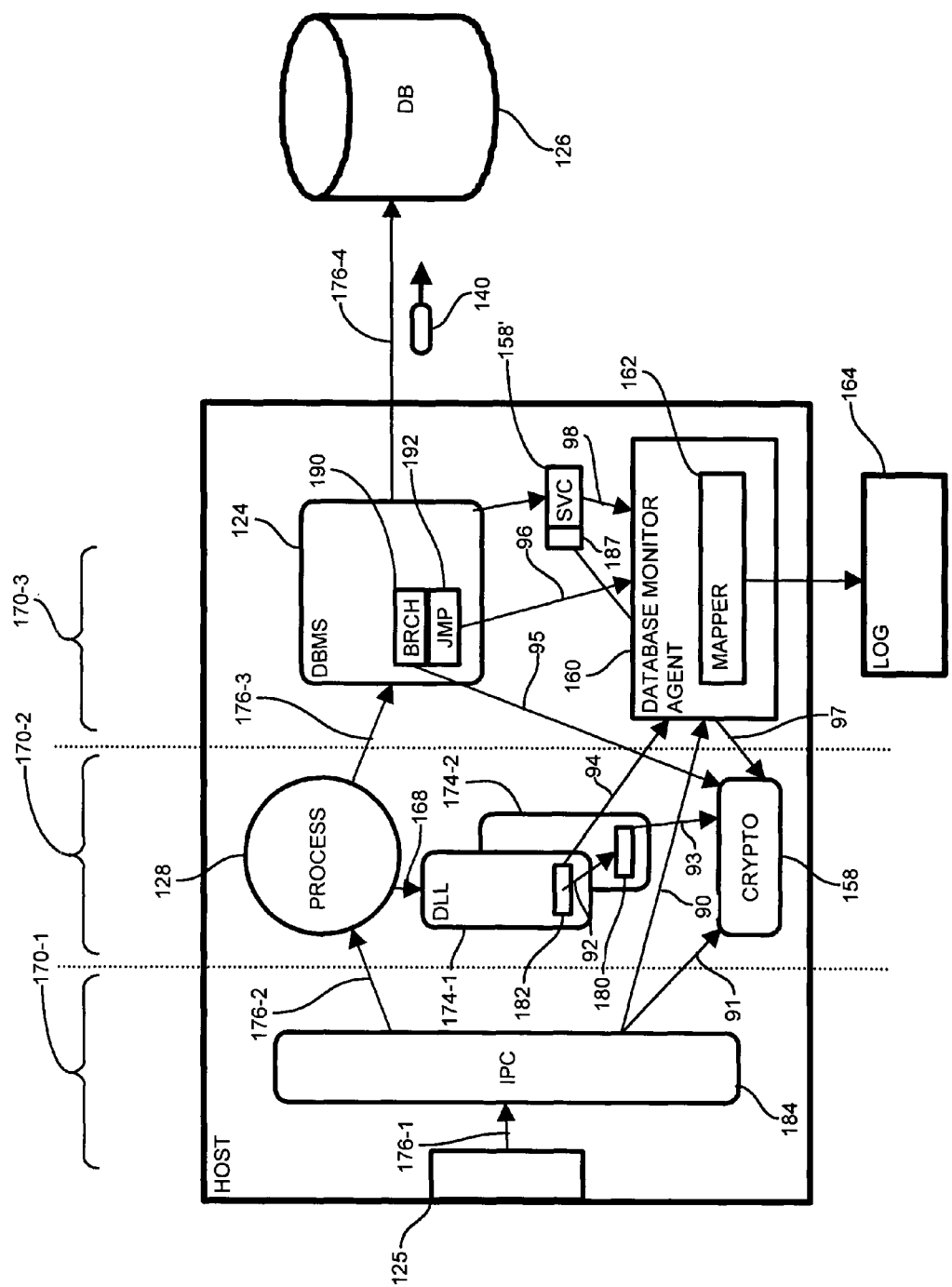
FIG. 3 is a block diagram of interception of secure data in transit as disclosed in FIG. 2.
Figure 4:
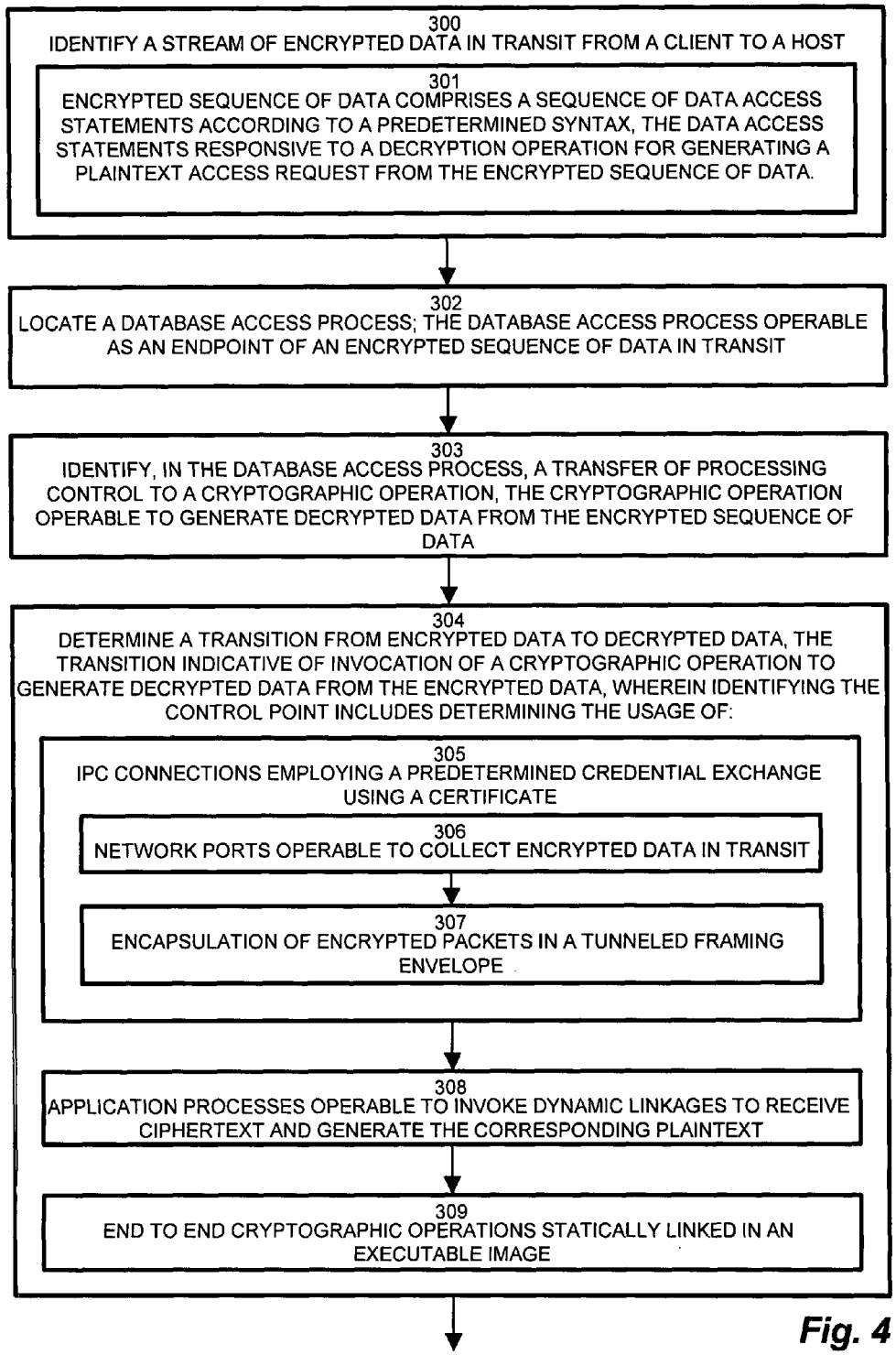
FIGS. 4-8 are a flowchart of an architecture for identifying and intercepting secure data in transit in the diagram of FIG. 3.
Figure 5:
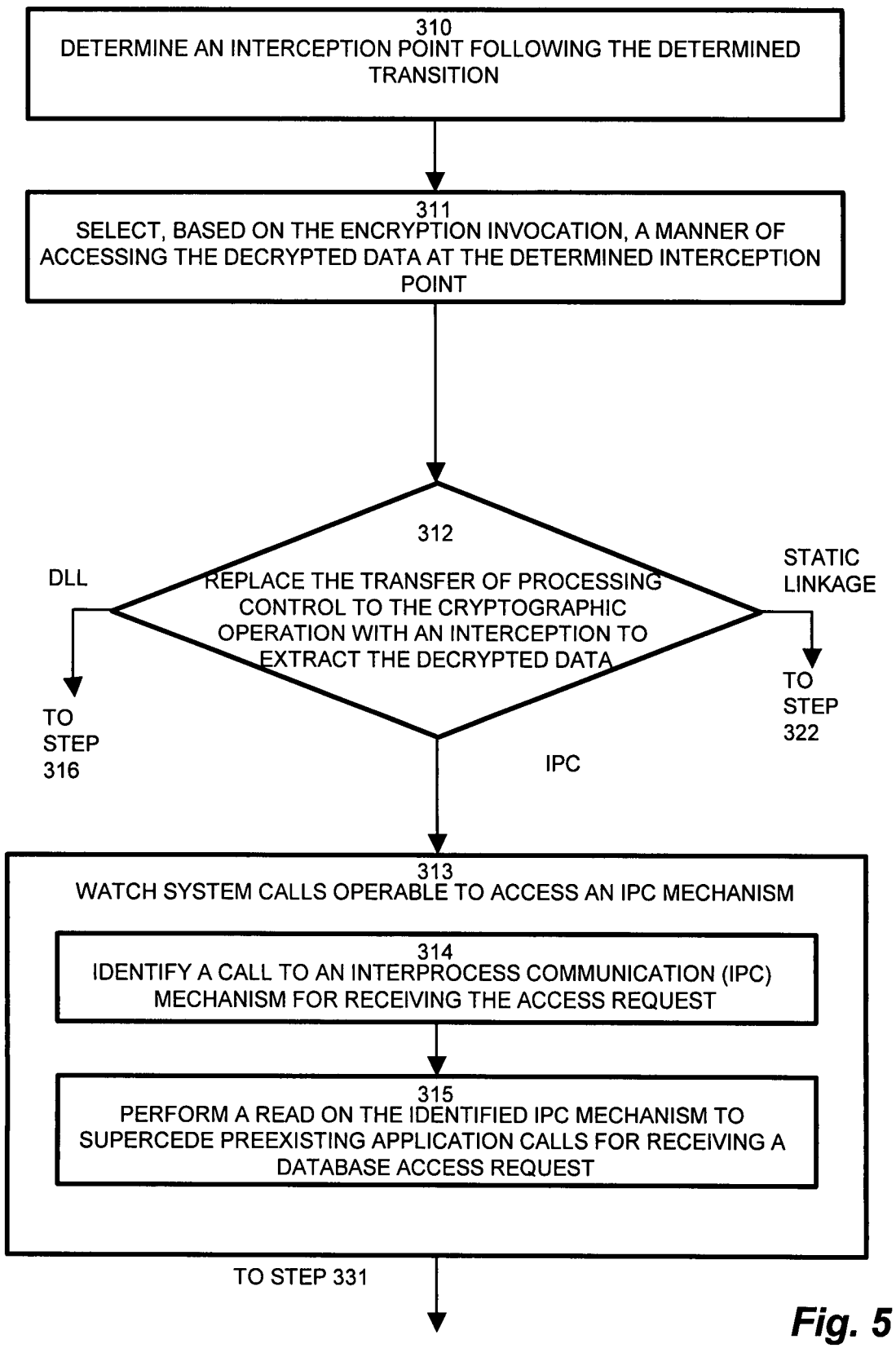
Figure 6:
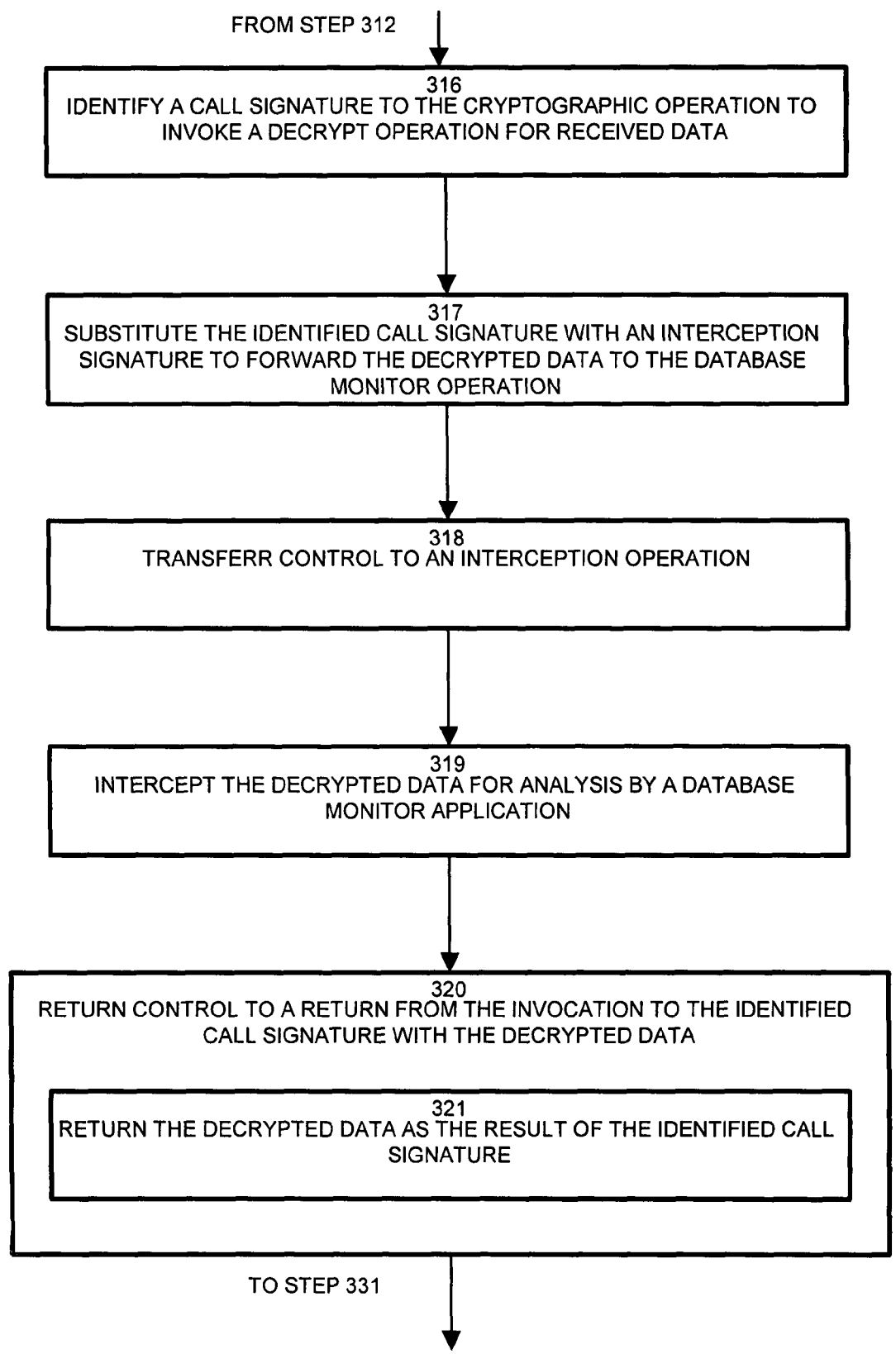
Figure 7:
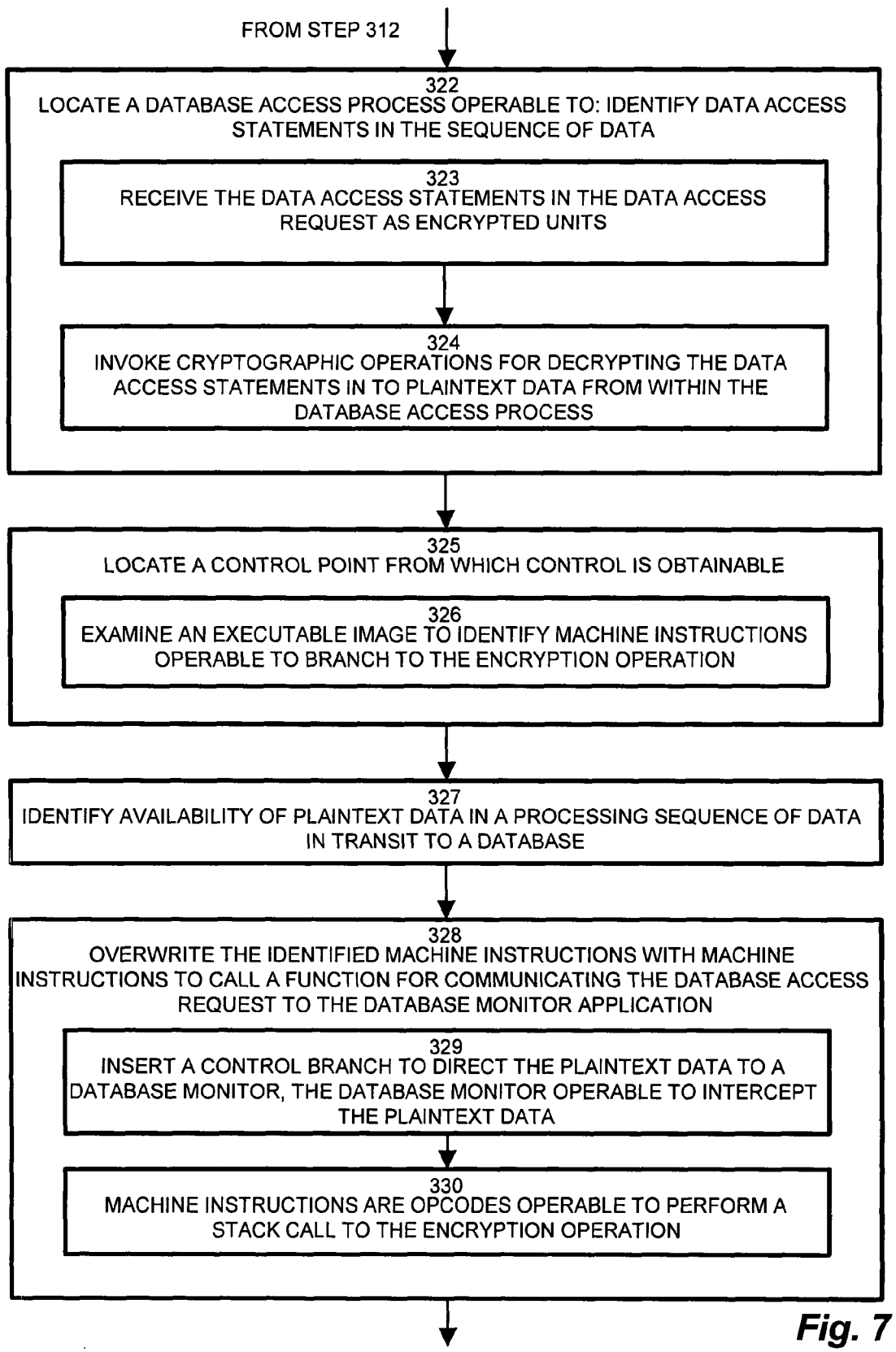
Figure 8:
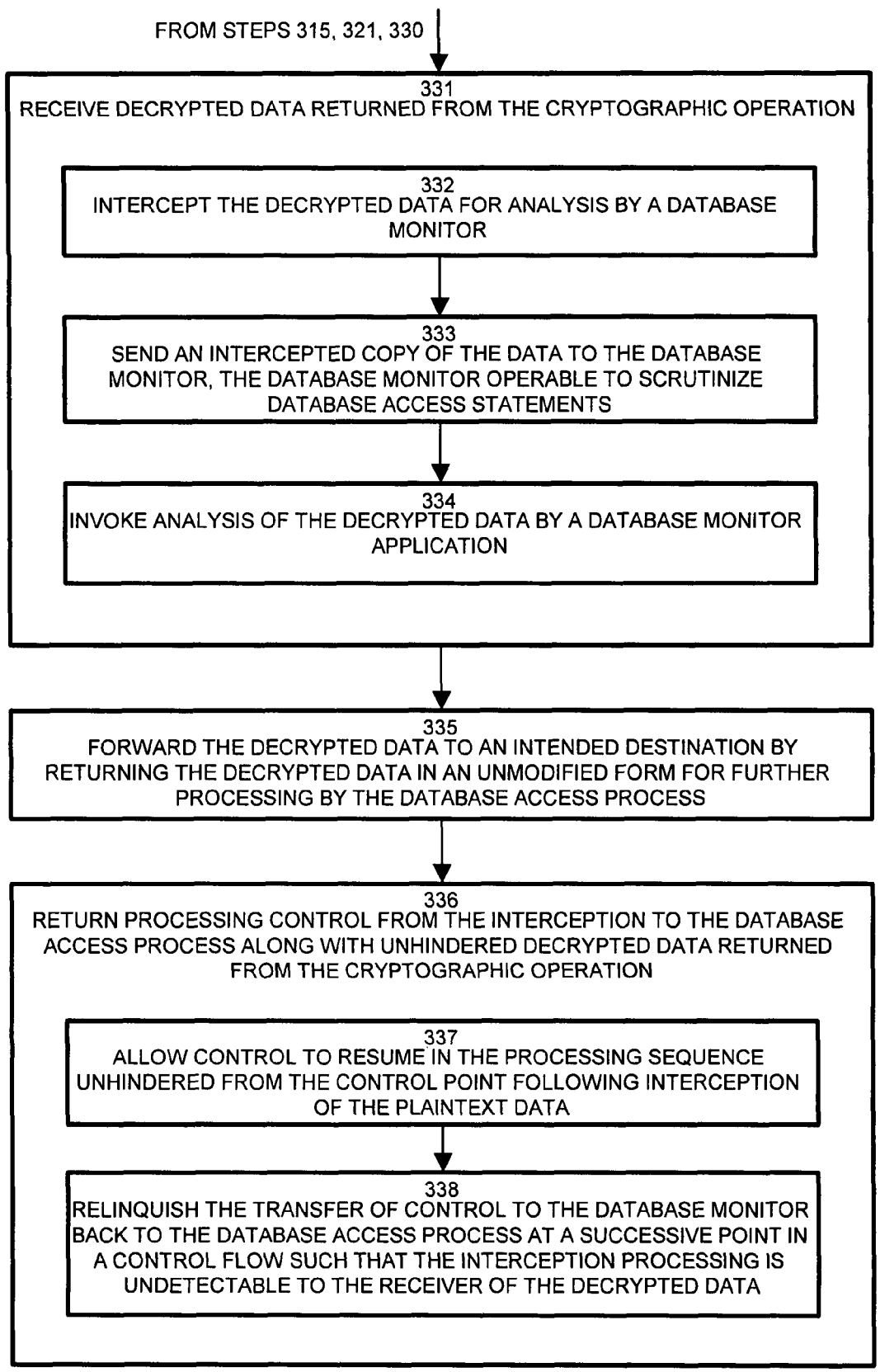

FIG. 3 is a block diagram of interception of secure data in transit according to different invocation mechanisms of the decryption operation as disclosed in FIG. 2. Referring to FIGS. 1 and 3, the example shows several mechanisms applicable to interception of encrypted data in transit between a user/requestor 110 and a host 120. The example shows a request transaction 140, however the data level security provided by the database monitor 154 is also applicable to a response transaction 142. In FIG. 3, different "zones" 170-1 . . . 170-3 (170 generally) of interception correspond to the progression in a processing stream 176-1 . . . 176-4 (176 generally) of the transaction 140 for which interception and scrutiny by the database monitor agent 160 is performed. The database monitor 154 determines, for the type of decryption being performed, the most appropriate zone 170 from which to intercept encrypted transactions 140.

The interception point 172 is generally an increment in processing just subsequent to the decryption of the transaction 140, and may include modifying processing control just prior to invocation of the decryption operation 158. The zones 170 each include interception points 172, which define where in the processing stream 176 the database monitor operates 160 to intercept the transaction 140. An alternate number of zones 170 may also be employed depending on the appropriate interception mechanism for capturing the encrypted data in transit defined by the transaction 140. Each of the zones 170 includes an interception point 172 at which a transfer of control from the database processing sequence is injected with an interception to seamlessly and nondestructively record and scrutinize the transaction 140, and optionally permitting unhindered progression of the transaction 140 along the intended stream 176.

A decryption operation 158 invocation operates in zone 170-1 via a network interface 125 based mechanism through IPC mediums. There are several scenarios. A physical device may perform hardware based decryption, at or just prior to the interface 125. A secure socket layer (SSL) or secure shell (SSH) interface may also be employed. Such an implementation typically employs operating system (OS) calls to post a read on a port for receiving the transaction 140. An invocation to the port read is interceptable by watching the system (i.e. kernel) calls to read the port, a feature supported by most modern operating systems. Alternatively, the private key portion of the public key pair employed for the encryption may be known, but this approach typically invokes knowledge of the underlying key management logic, as outlined above. The implementation of system call interceptions are discussed further in the copending U.S. patent application cited above, incorporated by reference.

Such an interception occurs generally as outlined above via the IPC mechanism 184, by transferring control of the cryptographic operation 158 to invoke the database monitor 160 after the invocation of the cryptographic operation 158, shows by arrows 90 and 91, respectively.

Alternatively, the data in transit may be decrypted by a dynamic linkage (e.g. DLL) invocation. The DLLs 174-1 . . . 174-2 are bound by searching for a matching signature (e.g. typically a method or function header) in DLLs. The signature to a DLL 174-2 signature 180 for invoking the cryptographic operation 158 is superceded by a DLL 174-1 having a matching interception signature 182 to transfer control to the database monitor 160, at control point 172-2. The interception signature 182 links a method that invokes 92 the cryptographic operation 158 through the original signature 180, which in turn invokes 93 the cryptographic operation 158, then invokes 94 the database monitor 154 for scrutinizing the transaction 140. It should be noted that the invocation of the database monitor 154 need not be a particular static or dynamic linkage suggested by the arrows 90-98, but may be any suitable control for diverting the transaction 140 for scrutiny by the database monitor 160.

In the case of end-to-end encryption to the DBMS 124, in zone 170-3, the DBMS invokes 95 the cryptographic operation 158 via a static linkage, typically a branch instruction 190 (opcode) in the DBMS process. The interception point 172-3 corresponding to the branch 190 is identified by examining machine instructions (opcodes) in the executable image (set of instructions) for the branch 190 opcode. The branch is either replaced or immediately followed with a jump 192 instruction for directing the transaction 140 to the database monitor 160 for scrutiny. Direct modification of the instruction sequence at the opcode level is a positionally specific modification that may be performed by disassembling the memory resident image, scanning memory locations for values corresponding to both the call opcode and the label of the cryptographic operation 158, or other suitable procedure.

In an alternate configuration, discussed above, the security service 158' is invoked by the DBMS process 124 or other process along the path 176. In this arrangement, the cryptographic operation 158 is invoked via an IPC call (in contrast to a stack call in the same process or address space discussed above) to the decryption service 158'. The database monitor 154 establishes a watch on the IPC mechanism, such as a port 187, to be employed for returning the decrypted (plaintext) data, shown by arrow 97, and delegates the intercepted data to the database monitor agent 160, as shown by arrow 98. As indicated above, the DBMS 124 intercepts the plaintext data by watching for port 187 reads, thus the (decrypted) data originates from the interface, as shown by arrow 99 (FIG. 1), and is triggered by the watch on the port 187 by the DBMS 124.

FIGS. 4-8 are a flowchart of the architecture for identifying and intercepting secure data in transit in the diagram of FIG. 3. Referring to FIGS. 1 and 3-8, the disclosed architecture for defining database security for encrypted data in transit includes identifying a stream of encrypted data in transit from a client to a host, as depicted at step 300. In the example shown, the encrypted sequence of data includes a sequence of data access statements according to a predetermined syntax, in which the data access statements are responsive to a decryption operation for generating a plaintext access request from the encrypted sequence of data, as disclosed at step 301. The predetermined syntax may be SQL (Structured Query Language), well know to those of skill in the art, or any other suitable syntax for composing the transaction 140 or response 142 for accessing the database.

Interception of encrypted data in transit includes locating a database access process 128, portal 124, or interface 125 such that the database access process is operable as an endpoint of an encrypted sequence 176 of data in transit, as depicted at step 302. The mechanism of transporting and decrypting the data in transit to the database is identified so that the existence of decrypted data in the stream 176 is located. The mechanism identifies, in the database access process 128, a transfer of processing control to a cryptographic operation 158, such that the cryptographic operation 158 is operable to generate decrypted data 175 from the encrypted sequence of data 176, as shown at step 303.

The database monitor 154 determines a transition 172 from encrypted data to decrypted data, in which the transition is indicative of invocation of a cryptographic operation to generate decrypted data 175 from the encrypted data 140, as disclosed at step 304. There are multiple points at which the transition may occur, because conventional database management systems employ multiple encryption arrangements. In the example shown, identifying a control point includes determining the usage of IPC connections employing a predetermined credential exchange using a certificate, as shown at step 305, or dynamic linked lists in which the application processes 122 are operable to invoke dynamic linkages 168 to receive ciphertext and generate the corresponding plaintext, as depicted at step 308. Another arrangement is a static linkage, in which end to end cryptographic operations are statically linked in an executable image (i.e. DBMS 124), as shown at step 309. Further, the IPC connections typically define either a secure interface including network ports operable to collect encrypted data in transit, as shown at step 306, or encapsulation of encrypted packets in a tunneled framing envelope, as disclosed at step 307. The usage of isolating particular port reads and tunneling is discussed further in the copending application cited above.

Based on the encryption arrangement, the database monitor 154 determines an interception point 172 following the determined transition, as shown at step 310. Interception occurs subsequent to availability of the plaintext (decrypted) data in the data stream 176, as soon as feasible in the flow 176-1 . . . 176-4. The database monitor 154 selects, based on the encryption invocation, a manner of accessing the decrypted data at the determined interception point 176, as shown at step 311. A check is performed, at step 312, to identify the manner of accessing the decryption operation 158 and the database monitor 154 replaces the transfer of processing control to the cryptographic operation 158 with a corresponding interception to extract the decrypted data. In the example shown, the database monitor identifies IPC mechanisms, dynamic linking (DLL) and static linkages from an executable image as manners of invoking the decryption operation 158, however other invocation mechanisms will be apparent to those of skill in the art.

If the check at step 312 indicates an IPC control mechanism 172-1, then the database monitor 154 establishes a watch or interrupt on system calls operable to access the IPC mechanism, as depicted at step 313. The watch allows the database monitor agent 160 to identify a call to an interprocess communication (IPC) mechanism, such as a port read, for receiving the access request, as disclosed at step 314, and performing an intervening read on the identified IPC mechanism to supercede preexisting application calls for receiving a database access request 140, as depicted at step 315.

If the check at step 312 indicates a DLL control mechanism 172-2, then identifying the transfer of processing control further includes identifying a call signature 180 to the cryptographic operation to invoke the decrypt operation 158 for received data 140, as shown at step 316. The database monitor 154 substitutes the identified call signature 180 with an interception signature 182 to forward the decrypted data 175 to the database monitor agent 160, as shown at step 317. Upon linking, the interception signature 182 is found first to transfer control to an interception operation, as shown at step 318, in which the interception operation is operable to intercept the decrypted data 175 for analysis by the database monitor application (agent) 160, shown as arrow 94, as disclosed at step 319. The interception operation invokes 92 the intended call signature 180, which in turn invokes 93 the decryption operation. The interception operation (signature 182) therefore sends 94 an intercepted copy of the data to the database monitor 160, in which the database monitor 154 is operable to scrutinize database access statements in the transaction 140.

The interception signature 182 returns control to a return from the invocation 168 to the identified call signature 180 with the decrypted data, as shown at step 320, therefore returning the decrypted data 175 as the result of the identified call signature 180 so that the database transaction 140 may continue unhindered along the path 176, as depicted at step 321.

If the check at step 312 indicated a static linkage, then accessing the decrypted data includes locating a database access process (i.e. DBMS) 124 operable to identify data access statements in the sequence of data, as depicted at step 322. The database access process is operable to receive the data access statements 140 in the data access request as encrypted units, as shown at step 323, and invoke cryptographic operations 158 to decrypt the data access statements 140 in to plaintext data from within the database access process 124 via a static linkage 95, as shown at step 324.

The database monitor 154 locates a control point 172-3 from which control is obtainable, as disclosed at step 325. For the static linkage, replacing the transfer of processing control further includes examining the executable image 124 to identify machine instructions 190 operable to branch to the encryption operation 158, as depicted at step 326. Examination of the executable image involves scanning or parsing the individual instructions (opcodes) in the sequence specified in the image, such as by disassembly, reverse engineering, or scanning the loaded program space in memory. The opcodes corresponding to the control transfer point 172-3, typically a branch instruction 190 with the label of the cryptographic operation 158, are identified. The return from the branch instruction 190 identifies availability of plaintext data in a processing sequence of data in transit to the database, as shown at step 327. The database monitor 154 inserts a control branch or jump 192 to direct the plaintext data to the database monitor 160, in which the database monitor 154 is operable to intercept the plaintext data, as shown at step 329. In the example shown, the machine instructions are opcodes operable to perform a stack call to the encryption operation, as shown at step 330, however alternate compilations, interpretations and static or dynamic binding mechanisms may be employed.

The database monitor overwrites the identified machine instructions (or inserts) with machine instructions 192 to call a function for communicating the database access request 140 to the database monitor application, as depicted at step 328, shown as arrow 96. The example jump instruction 192 shown may immediately follow or replace the branch instruction 190, and the control reverts back to the original database processing path 176 after invoking the cryptographic operation 158. Alternatively, other conditional or unconditional branching instructions may be employed.

Returning from steps 315, 321 or 330, depending on the transfer of control 176, the database monitor agent 160 receives decrypted data 175 returned from the cryptographic operation 158, as shown at step 331. This includes intercepting the decrypted data for analysis by the database monitor 154 by receiving it from the applicable interception, as shown at step 332, and sending the intercepted copy of the data to the database monitor agent 160, such that the database monitor 154 is operable to scrutinize the database access statements in the transaction 140, as shown at step 333. Sending the decrypted data 175 invokes analysis of the decrypted data by the database monitor 154, as shown at step 334. Concurrently, the interception point 176 may selectively return processing control from the interception to the database access process 190 along with unhindered decrypted data returned from the cryptographic operation 158. Depending on the operation of the database monitor 154, the monitor selectively allows or prohibits the transaction 140 to proceed. If the database monitor 154 does not intervene in the path 176, the mechanism forwards the decrypted data to the intended destination from the control point 172, as shown at step 335, thus returning the decrypted data in an unmodified form for further processing by the database access process 124 unbeknownst of the monitoring performed, as shown at step 336. The interception processing performed by the database monitor 154 therefore allows control to resume in the processing sequence unhindered from the control point 172 following interception of the plaintext data, as depicted at step 337. Interception processing relinquishes the transfer of control from the database monitor 154 back to the database access process 124 at a successive point in a control flow such that the interception processing is undetectable to the receiver of the decrypted data, as disclosed at step 338.

Those skilled in the art should readily appreciate that the programs and methods for interception of secure data in transit defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for interception of secure data in transit has been particularly shown and described with references to embodiments thereof, it will be understood by those skilled in the art that various changes in form and details may be made therein without departing from the scope of the invention encompassed by the appended claims.

What is claimed is:

1. A computer-implemented method of intercepting encrypted data in transit comprising:
    locating a database access process in a host computer system, the database access process operable as an endpoint of an encrypted sequence of data in transit and including at least decryption of the encrypted sequence;
    identifying, in the database access process, a transition of encrypted to decrypted data indicated by a transfer of processing control of the host computer system to a cryptographic operation, the cryptographic operation operable to generate decrypted data from the encrypted sequence of data;
    replacing the transfer of processing control of the host computer system to the cryptographic operation with an interception to extract the decrypted data;
    intercepting the decrypted data for analysis by a database monitor; and
    returning processing control of the host computer system from the interception to the database access process along with unhindered decrypted data returned from the cryptographic operation.

2. The computer-implemented method of claim 1 wherein identifying the transfer of processing control further comprises:
    identifying a call signature to the cryptographic operation to invoke a decrypt operation for received data;
    substituting the identified call signature with an interception signature to forward the decrypted data to a database monitor operation; and
    returning control to a return from the invocation to the identified call signature with the decrypted data.

3. The computer-implemented method of claim 2 wherein intercepting further comprises transferring control to an interception operation, the interception operation operable to:
    receive decrypted data returned from the cryptographic operation;
    invoke analysis of the decrypted data by a database monitor application; and
    return the decrypted data in an unmodified form for further processing by the database access process.

4. The computer-implemented method of claim 2 wherein intercepting further comprises:
    intercepting the decrypted data for analysis by a database monitor application;
    returning the decrypted data as the result of the identified call signature;
    sending an intercepted copy of the data to the database monitor, the database monitor operable to scrutinize database access statements; and
    forwarding the decrypted data to an intended destination.

5. The computer-implemented method of claim 1 wherein returning further comprises relinquishing the transfer of control to the database monitor back to the database access process at a successive point in a control flow such that the interception processing is undetectable to a receiver of the decrypted data.

6. The computer-implemented method of claim 1 wherein intercepting further comprises:
    watching system calls operable to access an IPC mechanism;
    identifying a call to an interprocess communication (IPC) mechanism for receiving an access request; and
    performing a read on the identified IPC mechanism to supercede preexisting application calls for receiving a database access request.

7. The computer-implemented method of claim 1 wherein locating the database access process further comprising locating a database access process operable to:
    identify data access statements in the sequence of data;
    receive the data access statements in a data access request as encrypted units; and invoke cryptographic operations for decrypting the data access statements into plaintext data from within the database access process.

8. The computer-implemented method of claim 1 wherein replacing the transfer of processing control further comprises:
examining an executable image to identify machine instructions operable to branch to the cryptographic operation; and
overwriting the identified machine instructions with machine instructions to call a function for communicating a database access request to a database monitor application.

9. The computer-implemented method of claim 8 wherein the identified machine instructions are opcodes operable to perform a stack call to the cryptographic operation.

10. A system for monitoring secure data in transit in a database environment comprising:
a host computer system including at least one processor configured for:
identifying a transition of encrypted to decrypted data indicated by a transfer of control of the host computer system in a processing sequence to a cryptographic operation;
determining an appropriate interception sequence operable to receive plaintext data returned from the cryptographic operation;
replacing the identified transfer of control of the host computer system with the determined interception sequence, the interception sequence operable to forward plaintext data from the cryptographic operation to a database monitor application; and
return the transfer of control of the host computer system and the plaintext data in an unmodified form to the processing sequence.

11. The system of claim 10 wherein identifying the transfer of control includes identifying at least one of:
operating system calls to an interprocess communication (IPC) mechanism;
a dynamically linked library (DLL) call to invoke a decryption operation; and
static linkage to the decryption operation.

12. A computer-implemented method for defining database security comprising:
identifying a stream of encrypted data in transit from a client to a host;
determining a transition from encrypted data to decrypted data within the host, the transition indicated by an invocation of a cryptographic operation by the host to generate decrypted data from the encrypted data;
determining an interception point following the determined transition in the host; and
selecting, based on the cryptographic invocation, a manner of accessing the decrypted data in the host at the determined interception point.

13. The computer-implemented method of claim 12 wherein selecting the manner of accessing includes:
identifying availability of plaintext data in a processing sequence of data in transit to a database;
locating a control point from which control is obtainable;
inserting a control branch to direct the plaintext data to a database monitor, the database monitor operable to intercept the plaintext data; and
allowing control to resume in the processing sequence unhindered from the control point following interception of the plaintext data.

14. The computer-implemented method of claim 13 wherein the encrypted data comprises a sequence of data access statements according to a predetermined syntax, the data access statements responsive to a decryption operation for generating a plaintext access request from the encrypted data.

15. The computer-implemented method of claim 14 wherein identifying the control point includes determining usage of at least one of:
end to end cryptographic operations statically linked in an executable image;
IPC connections employing a predetermined credential exchange using a certificate; and
agent processes operable to receive ciphertext and generate corresponding plaintext.

16. The computer-implemented method of claim 15 wherein the IPC connections further define a secure interface including at least one of:
network ports operable to collect encrypted data in transit; and
encapsulation of encrypted packets in a tunneled framing envelope.

17. A database security monitor for intercepting encrypted data in transit comprising:
a host computer system including a database monitor agent operable to locate a database access control point in the host computer system, the database access control point operable as an endpoint of an encrypted sequence of data in transit, the database monitor agent configured to identify, based on the database access control point, a transition of encrypted to decrypted data indicated by a transfer of processing control of the host computer system to a cryptographic operation, the cryptographic operation operable to generate decrypted data from the encrypted sequence of data, the database monitor agent further operable to:
replace the transfer of processing control of the host computer system to the cryptographic operation with an interception to extract the decrypted data;
intercept the decrypted data for analysis by a database monitor; and
return processing control of the host computer system from the interception to a database access process of the host computer system along with unhindered decrypted data returned from the cryptographic operation.

18. The database security monitor of claim 17 wherein the configured database agent is responsive to the transfer of processing control to:
identify a call signature to the cryptographic operation to invoke a decrypt operation for received data;
substitute the identified call signature with an interception signature to forward the decrypted data to a database monitor operation; and
return control to a return from the invocation to the identified call signature with the decrypted data.

19. The database security monitor of claim 18 wherein the interception signature is operable to:
receive decrypted data returned from the cryptographic operation;
invoke analysis of the decrypted data by a database monitor application; and
return the decrypted data in an unmodified form for further processing by the database access process.

20. The database security monitor of claim 18 wherein the interception signature is operable to relinquish the transfer of control to the database monitor back to the database access process at a successive point in a control flow such that the interception processing is undetectable to a receiver of the decrypted data.

21. The database security monitor of claim 17 wherein the database monitor agent is further operable to:
watch system calls operable to access an IPC mechanism;
identify a call to an interprocess communication (IPC) mechanism for receiving an access request; and
perform a read on the identified IPC mechanism to supercede preexisting application calls for receiving a database access request.

22. The database security monitor of claim 17 wherein the database monitor agent is operable to locate database access operations operable to:
identify data access statements in the sequence of data;
receive the data access statements in a data access request as encrypted units; and
invoke cryptographic operations for decrypting the data access statements into plaintext data from within the database access process.

23. The database security monitor of claim 22 wherein the database monitor agent is further operable to:
examine an executable image to identify machine instructions operable to branch to the cryptographic operation; and
overwrite the identified machine instructions with machine instructions to call a function for communicating the database access request to a database monitor application.

24. The database security monitor of claim 23 wherein the identified machine instructions are opcodes operable to perform a stack call to the cryptographic operation.

25. A computer program product having a computer readable memory device operable to store computer program logic embodied in computer program code encoded thereon for defining database security for encrypted data in transit comprising:
computer program code for identifying a stream of encrypted data in transit from a client to a host;
computer program code for determining a transition from encrypted data to decrypted data within the host, the transition indicated by invocation of a cryptographic operation by the host to generate decrypted data from the encrypted data;
computer program code for determining an interception point following the determined transition in the host; and
computer program code for selecting, based on the cryptographic invocation, a manner of accessing the decrypted data at the determined interception point, further including:
computer program code for identifying availability of plaintext data in a processing sequence of data in transit to a database;
computer program code for locating a control point from which control is obtainable;
computer program code for inserting a control branch to direct the plaintext data to a database monitor, the database monitor operable to intercept the plaintext data, including computer program code for examining an executable image to identify machine instructions operable to branch to the cryptographic operation, and overwrite the identified machine instructions with machine instructions to call a function for communicating the decrypted data to the database monitor; and
computer program code for allowing control to resume in the processing sequence unhindered from the control point following interception of the plaintext data.

26. A computer-implemented method of intercepting encrypted data in transit comprising:
identifying in a host computer system a transition from encrypted to decrypted data indicated by an invocation of a cryptographic operation in the host computer system, the invocation performing a transfer of processing control of the host computer system to the cryptographic operation operable to generate decrypted data from the encrypted data in transit, identifying the invocation further comprising:
identifying a cryptographic service responsive to an application receiving the encrypted data in transit; and
identifying a manner of accessing the cryptographic service from the application;
replacing the transfer of processing control of the host processing system to the cryptographic operation with an interception to extract the decrypted data;
intercepting the decrypted data for analysis by a database monitor; and
returning processing control of the host computer system from the interception to a database access process along with undisturbed decrypted data returned from the cryptographic operation.

27. The computer-implemented method of claim 26 wherein intercepting further comprises:
watching system calls operable to access an IPC mechanism for invoking the cryptographic service;
identifying a call to an interprocess communication (IPC) mechanism for receiving an access request; and
performing a read on the identified IPC mechanism to supercede preexisting application calls for receiving a database access request.

28. The computer-implemented method of claim 27 wherein the manner of accessing includes a predetermined port, further comprising watching port activity with respect to the predetermined port to receive decrypted data.

29. The computer-implemented method of claim 28 further comprising:
determining the predetermined port employed by the cryptographic operation for transporting plaintext data;
identifying a processing unit assigned to service the cryptographic operation; and
capturing invocations to read the port by the identified processing unit.

* * * * *